US008376531B2

(12) United States Patent
Collie et al.

(10) Patent No.: US 8,376,531 B2

(45) Date of Patent: Feb. 19, 2013

(54) ANGULAR VALVE ACTUATOR

(75) Inventors: Lynn A Collie, Battle Ground, WA (US); Scott Martin, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 87 days.

(21) Appl. No.: 13/053,434

(22) Filed: Mar. 22, 2011

(65) Prior Publication Data

US 2012/0242760 A1 Sep. 27, 2012

(51) Int. Cl.

*B41J 2/175* (2006.01)
*B41J 2/165* (2006.01)
*F16K 11/052* (2006.01)

(52) U.S. Cl. ........................ 347/85; 137/625.44; 347/29

(58) Field of Classification Search .................... 347/85, 347/29; 251/227, 228, 231; 137/625.44

See application file for complete search history.

(56) References Cited

U.S. PATENT DOCUMENTS 4,870,431 A 9/1989 Sousa et al.
5,086,305 A * 2/1992 Terasawa ........................ 347/30
6,083,130 A * 7/2000 Mevissen et al. ............... 474/70
7,287,842 B2 * 10/2007 Aruga ............................. 347/84
7,722,151 B2 5/2010 Elenes et al.
2002/0067388 A1 * 6/2002 Shimizu et al. ................. 347/33
2007/0081056 A1 * 4/2007 Ito .................................. 347/85
2009/0303282 A1 * 12/2009 Yamamoto ...................... 347/32
2010/0033530 A1 2/2010 Bryant et al.
2010/0253738 A1 * 10/2010 Jariabka et al. ................ 347/32

FOREIGN PATENT DOCUMENTS

JP 2010000626 A * 1/2010

* cited by examiner

*Primary Examiner* — Matthew Luu
*Assistant Examiner* — Alexander D Shenderov
(74) *Attorney, Agent, or Firm* — Scott K. Gallert

(57) ABSTRACT

Apparatus and methods are provided for use with printers and imaging apparatus. An actuator is supported on a shaft about which it can rotate through a range of arc. A spring biases the actuator so as to bring a valve pad into sealing contact with a plurality of nozzles. A lever arm of the actuator is operable by way of force contact so as to rotate the actuator and angularly displace the valve pad out of contact with the nozzles. Simultaneous opening or closing of the nozzles is performed by way of corresponding angular displacements of the actuator.

11 Claims, 6 Drawing Sheets

ANGULAR VALVE ACTUATOR

BACKGROUND

Printers produce images on media, such as paper, in accordance with digital data or electronic signaling. Liquid inks of various colors are commonly used in such printers. Printers, all-in-ones and related apparatus of progressively smaller form factors are being developed in the interest of market expectations. These smaller form factors present various design challenges in order to achieve their operational objectives. The present teachings address the foregoing and other concerns.

BRIEF DESCRIPTION OF THE DRAWINGS

The present embodiments will now be described, by way of example, with reference to the accompanying drawings, in which.

DETAILED DESCRIPTION

Introduction

Apparatus and methods are provided for use with printers and imaging apparatus. An actuator is supported on a shaft about which it can rotate through a range of arc. A spring biases the actuator to bring a valve pad into sealing contact with a plurality of nozzles. A lever arm of the actuator is operable by way of force contact to rotate the actuator, angularly displacing the valve pad out of contact with the nozzles. Simultaneous opening or closing of the nozzles is performed by way of angular displacements of the actuator.

In one example, a mechanism includes a pair of nozzles for fluid communication, and a valve pad to be moved into and out of sealing contact with the nozzles. The mechanism also includes an actuator having a support arm to support the valve pad. The actuator also includes a spring to bias the valve pad into sealing contact with the nozzles. The actuator further has a lever arm configured such that an angular displacement of the lever arm moves the valve pad out of sealing contact with the nozzles.

In another example, a plural valve mechanism includes a plurality of nozzles each defining a valve seat. The plural valve mechanism also includes a valve pad to close the nozzles by way of sealing contact with the valve seats. The plural valve mechanism further includes an actuator including a spring to urge the valve pad into closing the nozzles by way of angular displacement of the actuator in a first direction. The actuator has a lever arm to displace the valve pad to open the nozzles by way of angular displacement of the actuator in a second direction opposite to the first direction.

In yet another example, a method includes displacing a lever arm of an actuator so as to open a plurality of valve seats of respective nozzles. The nozzles are in fluid communication with a gas when open. The method also includes driving a pump into a prepare position. The pump is in fluid communication with the valves. The method also includes biasing the actuator by way of a spring so as to close the valve seats. The method further includes driving the pump so as to prime a printhead array of a printer with a liquid ink.

First Illustrative Apparatus

Figure 1B:
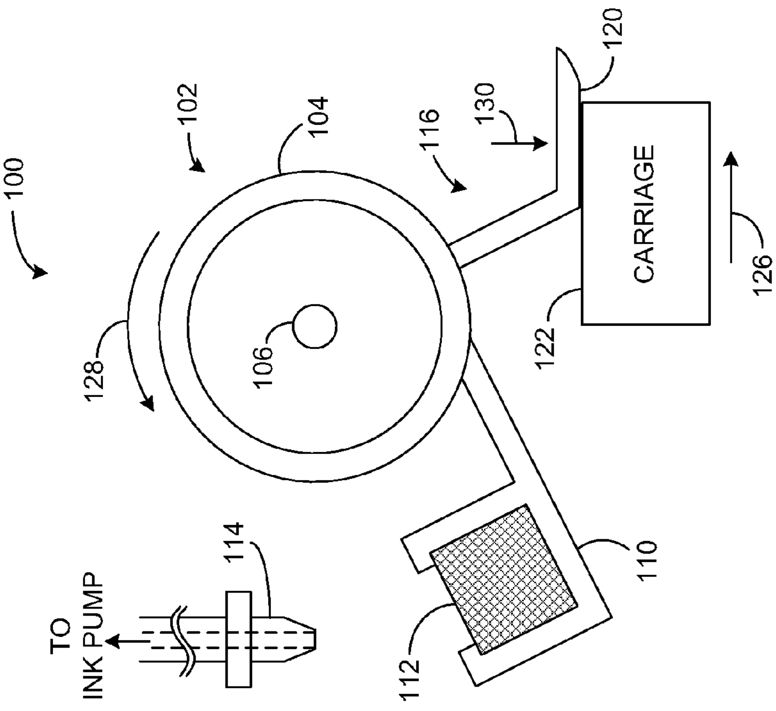
FIG. 1B is a plan diagram of the apparatus of FIG. 1 in a second operational state.
Figure 1A:
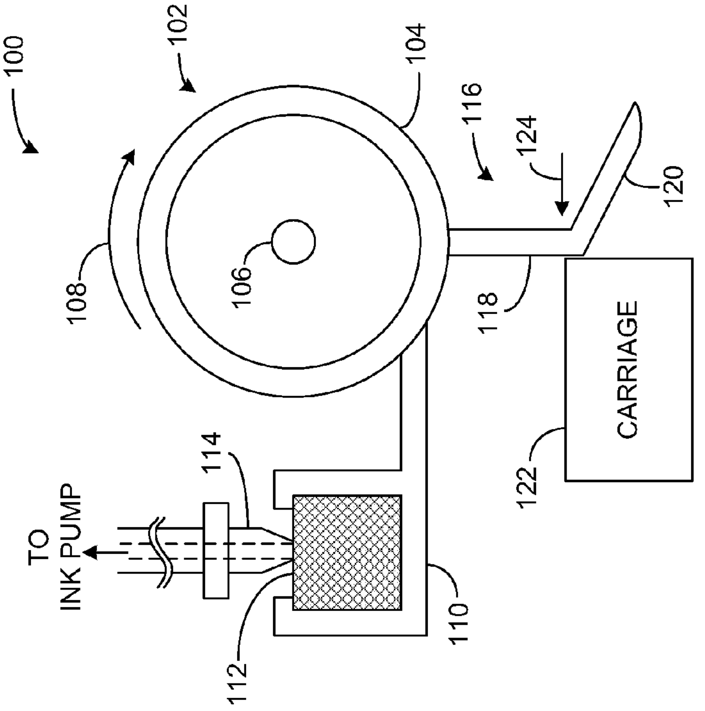
FIG. 1A is a plan diagram of an apparatus including an actuator in a first operational state according to one example of the present teachings.

Reference is now directed to FIG. 1A which depicts a plan view of an apparatus 100 in a first operational state. The apparatus 100 is illustrative and non-limiting with respect to the present teachings. Thus, other apparatuses, devices or systems can be configured and/or operated in accordance with the present teachings.

The apparatus 100 includes an actuator 102. The actuator 102 can be formed from any suitable material such as acetal, aluminum, and so on. Other suitable materials can also be used. The actuator 102 includes a cylindrical body portion 104 rotationally supported on a central shaft 106. The actuator 102 also includes an internal spring (see 618 of FIG. 6) configured to rotationally or angularly bias the cylindrical body portion 104 in a first direction 108 about the shaft 106.

The actuator 102 also includes a support arm portion (support arm) 110 that extends away from the cylindrical portion 104. The support arm 110 includes a valve pad 112. The valve pad 112 is formed from a compliant material such as, for non-limiting example, Ethylene Propylene Diene Monomer (EPDM) rubber. In one example, the valve pad 112 is form from EPDM rubber characterized by a relative low hardness of about twenty Shore A. Other suitable materials can also be used.

The valve pad 112 is in compliant, sealing contact with a nozzle 114. The nozzle 114 is fluidly coupled to an ink pump of a printer apparatus (see FIG. 3). The first operational state of the actuator 102 is therefore defined by spring biased, sealing contact of the valve pad 112 against the nozzle 114, thus sealing or closing the nozzle 114 against fluidic communication with ambient conditions (i.e., air or gas).

The actuator 102 further includes a lever arm portion (lever arm) 116 characterized by a first portion 118 that extends about radially away from the cylindrical portion 104, and a second portion 120 extending at an angle of at least twenty degrees to the first portion 118. The lever arm 116 is configured to mechanically couple forces from a movable printhead carriage (carriage) 122 to the cylindrical portion 104 of the actuator 102. Force contact with the moving or displaced carriage 122 will overcome the spring bias and cause angular displacement of the cylindrical portion 104 by way of the lever arm 116.

In one example, the cylindrical portion 104, the support arm 110 and the lever arm 116 are respective aspects of a monolithic, one-piece construct. It is also noted that the lever arm 116 makes spring-biased contact with the carriage 122 (or a portion or extension thereof) characterized by a force vector 124. The force vector 124 results in about maximum torque or moment with respect to the rotational axis (i.e., shaft 106) of the cylindrical portion 104 when the actuator 102 is in the first operational state.

Attention is now turned to FIG. 1B which depicts the apparatus 100 in a second operational state. The carriage 122 is displaced to the right in a direction 126 relative to its position in FIG. 1A. The lever arm 116 has been angularly displaced by way of force contact with the carriage 122 and the resulting rotational displacement 128 has been communicated to the cylindrical portion 104. It is noted that the second portion 120 of the lever arm 116 is about parallel to the contacting portion of the carriage 122. Spring bias of the actuator 102 results in a force vector 130 that maintains contact between the lever arm 116 and the carriage 122.

The second operational state of the apparatus 100 is characterized by the valve pad 112 displaced away from the nozzle 114. The nozzle 114 is now in fluid communication with the ambient environment (i.e., air or gas). The carriage 122 is referred to as being in a "right home" position in FIG. 1B for purposes herein.

The actuator 102 is therefore configured such that valve pad 112 is in compliant, sealing contact with the nozzle 114—such that the nozzle 114 is considered closed—in the first operational state. The actuator 102 is further configured such that the valve pad 112 is moved out of sealing contact with the nozzle 114—such that the nozzle 114 is considered open—in the second operational state. Internal spring biasing of the actuator 102 urges the support arm 110 and the valve pad 112 into or toward the first operational state when the carriage 122 is moved sufficiently away from the right home position.

Illustrative Actuator

Figure 2:
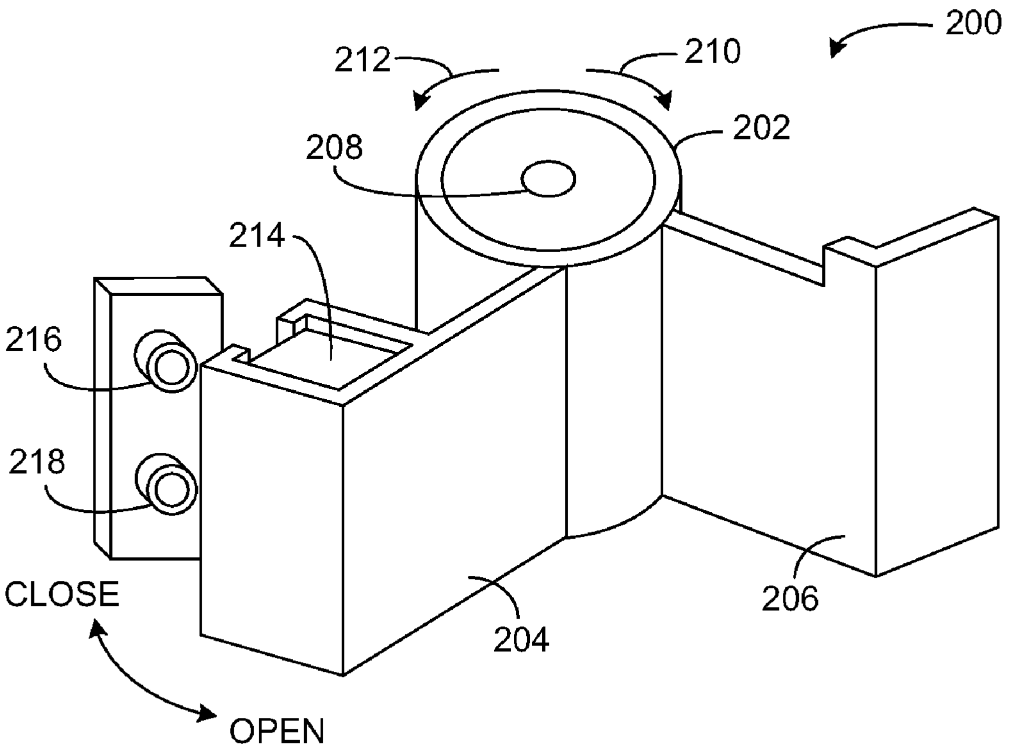
FIG. 2 is an isometric diagram of an actuator according to another example of the present teachings.

Attention is now directed to FIG. 2, which depicts an isometric-like diagram of an actuator 200. The actuator 200 is illustrative and non-limiting with respect to the present teachings. Thus, other actuators, devices or systems can be configured and/or operated in accordance with the present teachings. In one example, the actuator 200 is analogous to the actuator 102.

The actuator 200 includes a cylindrical portion or body 202, a support arm 204 and a lever arm 206. The actuator 200 can be formed from any suitable material. In one example, the actuator is formed from acetal, which is compatible with printer inks. The actuator 200 can also be formed by molding or other processes such that a monolithic or one-piece entity is defined.

The actuator 200 is supported on a shaft 208. The actuator 200 is configured to be bidirectionally rotated or angularly displaced about the shaft 208. Specifically, the actuator 200 is biased by way of an internal spring (see 618 of FIG. 6) so as to rotate at least some minimal angular distance in a direction 210. The actuator is further configured to be rotated at least some other angular distance in a direction 212 by way of forced displacement of the lever arm 206. These directions 210 and 212 are also referred to as a "close" direction and an "open" direction, respectively.

The support arm 204 supports a valve pad 214 made of a compliant material. In one example, the valve pad 214 is formed from or includes EPDM rubber. Other suitable materials can also be used. The valve pad 214 makes sealing contact with a pair of nozzles 216 and 218, respectively, when the actuator 200 is fully (or about) angularly displaced in the "close" direction 210. Conversely, the valve pad 214 is moved out of sealing contact with the nozzles 216 and 218 when the actuator 200 is angularly displaced in the "open" direction 212 by way of force contact with the lever arm 206.

The actuator 200 is configured to simultaneously close the nozzles 216 and 218 by way of spring biasing in the direction 210. The actuator 200 is further configured to simultaneously open the nozzles 216 and 218 by way of forced angular displacement in the direction 212. The valve pad 214 performs sealing contact of the nozzles 216 and 218 during closure, while a moving printhead carriage (e.g., 122) opens the nozzles 216 and 218 by working against the lever arm 206.

Illustrative Printing Apparatus

Figure 3:
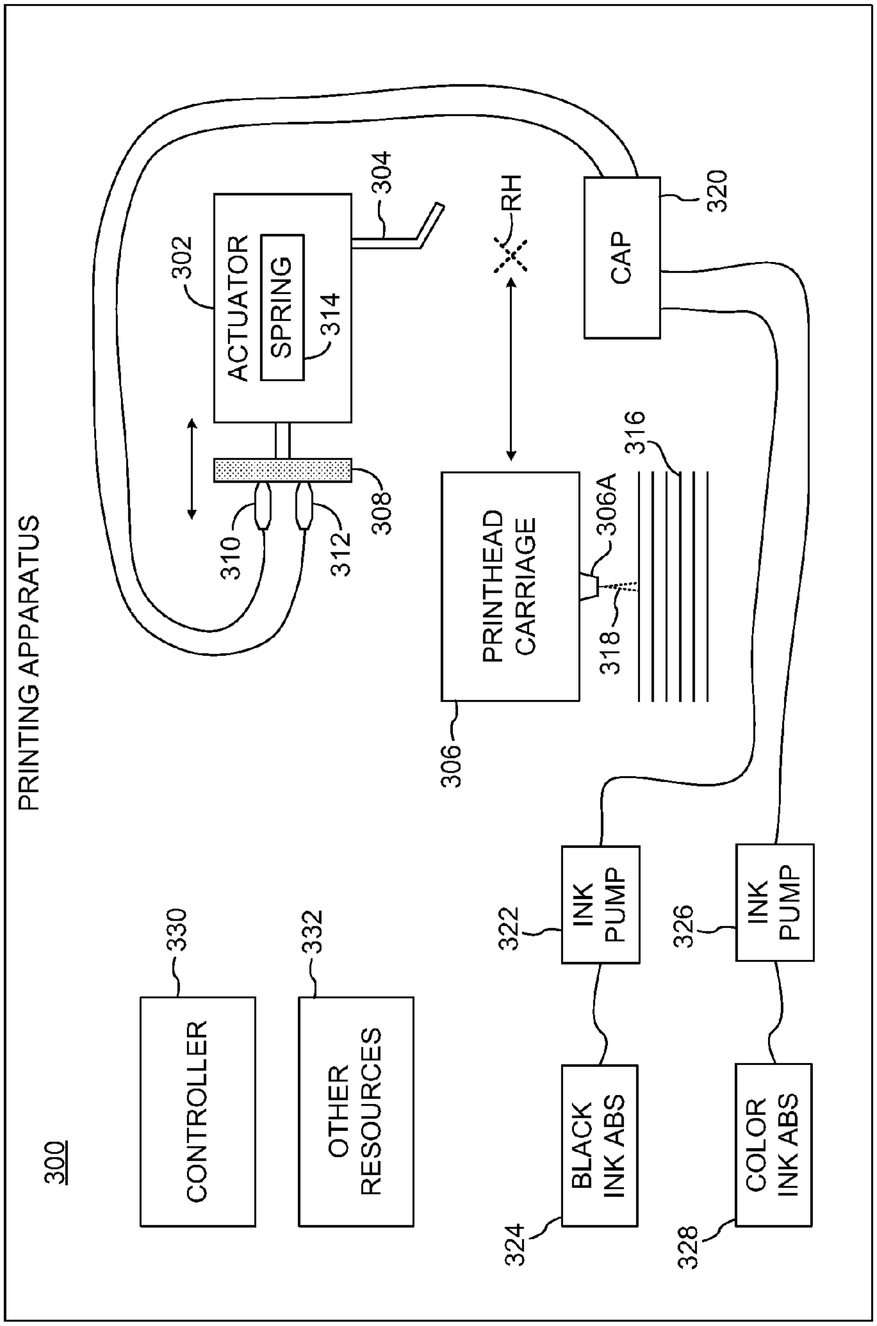
FIG. 3 is a block diagram depicting a printing apparatus according to another example of the present teachings.

Attention is now directed to FIG. 3, which depicts a block diagram of a printing apparatus (printer) 300. The printer 300 is illustrative and non-limiting with respect to the present teachings. Thus, other printers, devices or systems can be configured and/or operated in accordance with the present teachings.

The printer 300 includes an actuator 302. The actuator 302 is depicted in block diagrammatic form in the interest of clarity and understanding. The actuator 302 is defined by a rotational actuator in accordance with the present teachings. The actuator 302 includes a lever arm 304 configured to be angularly displaced by way of force contact with a printhead carriage 306.

The actuator 302 also includes valve pad 308 supported thereby. The actuator 302 is configured to move the valve pad 308 out of sealing contact with respective nozzles 310 and 312 in response to a corresponding displacement of the lever arm 304. The actuator 302 is also configured urge or bias the valve pad 308 into sealing contact with the nozzles 310 and 312 by way of a spring 314. In one example, the spring 314 is a helically wound spring. Other springs can also be used.

The printer 300 also includes the printhead carriage 306 introduced above. The printhead carriage or carriage 306 includes one or more printheads or pens 306A configured to form images on sheet media 316 by way of ink-jetting 318. The carriage 306 is configured to be bidirectionally translated along at least one axis by way a motor drive (not shown). The range of motion of the carriage 306 includes a right home position "RH" wherein contact with the lever arm 304 results in an open condition of the nozzles 310 and 312.

The printer 300 also includes printhead cap or cap 320. The printhead cap 320 is configured to cover the one or more printheads 306A when the carriage 306 is centered in the right home position RH. The printhead cap 320 is also configured to receive any liquid ink that discharges from the printheads 306A during certain normal operations of the printer 300.

The printer 300 also includes an ink pump 322. The ink pump 322 is coupled in fluid communication with the cap 320 via tubing. The ink pump 322 is also in fluid communication with black ink absorber 324, which is configured to receive and absorb (i.e., trap) any waste black ink during normal automatic servicing routines of the printer 300.

The printer 300 also includes another ink pump 326. The ink pump 326 is coupled in fluid communication with the cap 320 via tubing. The ink pump 326 is also in fluid communication with color ink absorber 328 configured to receive and absorb (i.e., trap) any waste color ink during normal automatic servicing routines of the printer 300. Such colors of ink can include cyan, magenta and yellow, and so on, as used by respective printheads 306A borne by the carriage 306. In one example, the ink pumps 322 and 326 are defined by respective peristaltic pumps.

The printer 300 further includes a controller 330. The controller 330 can be defined by any suitable electronic circuitry including, without limitation, a microprocessor, a microcontroller, a state machine, digital or analog or hybrid circuitry, an application specific integrated circuit (ASIC), and so on. The controller 330 is configured to control various normal operations of the printer 300 so as to form images on sheet media. Other normal operations, such as automated servicing of the printheads 306A, can also be performed. The controller 330 is electrically coupled to the printheads 306A within the carriage 306, the respective ink pumps 322 and 326, and other aspects of the printer 300 as needed for normal operations. Such electrical couplings are omitted from FIG. 3 in the interest of clarity and are not germane to an understanding of the present teachings.

The printer 300 also includes other resources 332. Non-limiting examples of such other resources 332 include a power supply, input/output communications circuitry, sheet handling mechanisms, network communications circuitry, data storage media, wireless resources, a user interface, media scanning apparatus, and so on. It is to be understood that various embodiments of printer 300 or other imaging apparatuses can be defined and operated, and that such other resources 332 are not germane to the present teachings.

General operation of the printer 300 is as follows: The controller 330 receives data from an external entity such as a computer (not shown). The data corresponds to an image or images to be formed on sheet media 316 by way of ink deposition. The controller 330 then provides appropriate control signaling to the ink pumps 322 and 326, the printheads 306A, and other resources 332 as required to perform printing or other normal operations.

During the course of such normal operations, the controller 330 causes the carriage 306 to be driven to various locations. Sufficient translation of the carriage 306 to or toward the right home position RH causes force contact with the lever arm 304, resulting in an opening of the nozzles 310 and 312. That is, the valve pad 308 is moved out of sealing contact with the nozzles 310 and 312 by way of the lever arm 304. The ink pumps 322 and 326 are in fluid communication with ambient conditions (air or gas) when the nozzles 310 and 312 are open.

Various normal operations such as evacuating ink or air from the printheads 306A, priming liquid ink into the printheads 306A, and so on, can be performed by way of appropriate opening and closing of the nozzles 310 and 312. Such respective opening and closing operations are performed by carriage 306 interactions with the lever arm 304. Further discussion as to particular operations of the printer 300 is provided hereinafter.

Illustrative Method

Figure 4:
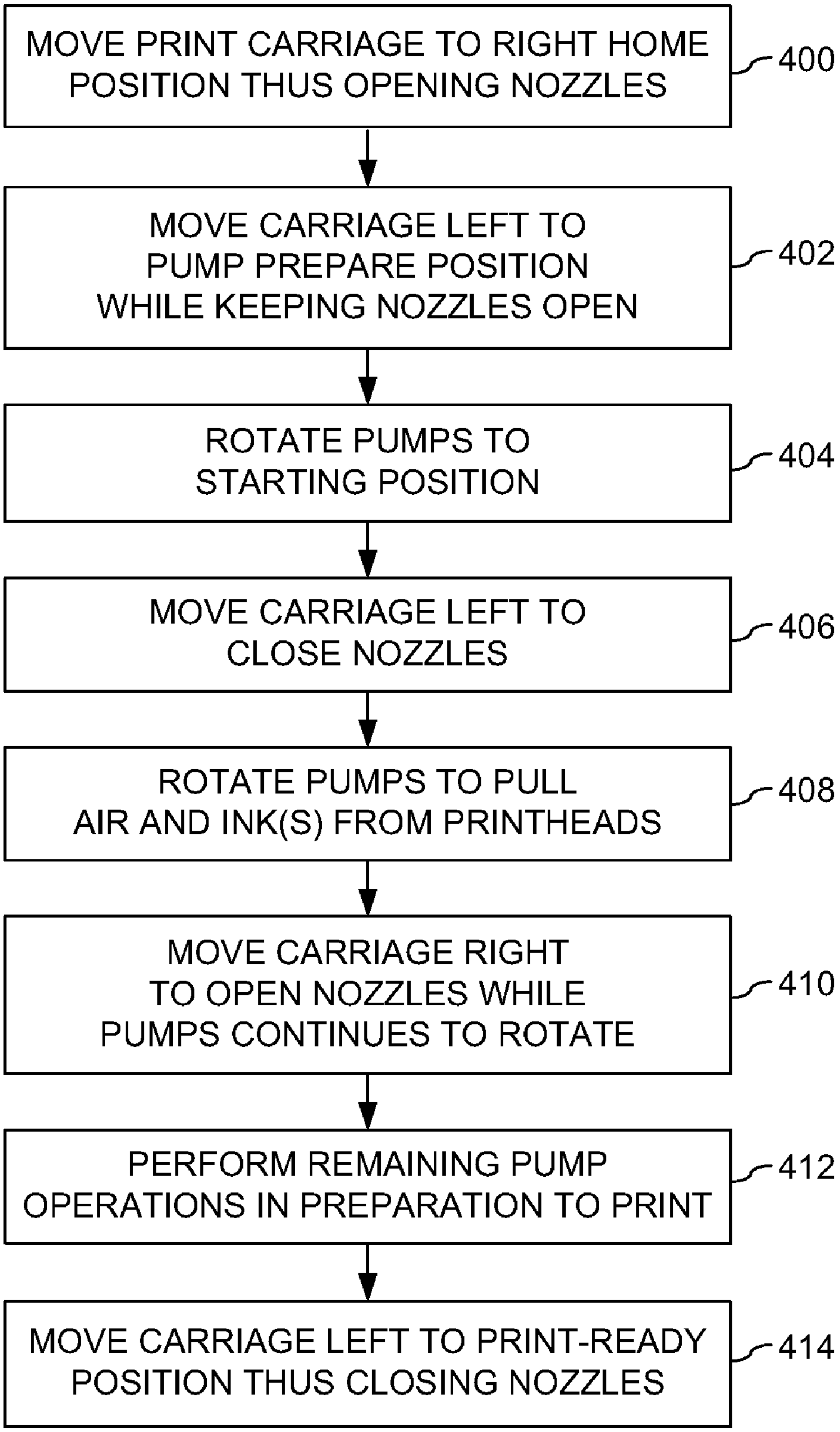
FIG. 4 is a flow diagram depicting a method according to an example of the present teachings.

Reference is now made to FIG. 4, which depicts a flow diagram of a method according to the present teachings. The method of FIG. 4 includes particular operations and order of execution. However, other methods including other operations, omitting one or more of the depicted operations, and/or proceeding in other orders of execution can also be used according to the present teachings. Thus, the method of FIG. 4 is illustrative and non-limiting in nature. Reference is made to FIGS. 1A-1B and 3 in the interest of understanding FIG. 4.

At 400, a print carriage is moved to its right home position resulting in the opening of a pair of nozzles. For purposes of a present example, the carriage 306 is shifted toward right home position RH and into driving contact with the lever arm 304 of the actuator 302. Angular displacement of the lever arm 304 away from its spring-biased resting position causes the valve pad 308 to be moved out of sealing contact with the nozzles 310 and 312. In another analogous example, the carriage 122 is shifted in the direction 126 so that the valve pad 112 is moved out of contact with the nozzle 114 by way of angular rotation of the actuator 102. Other printer operations can also be performed that are not germane to the present teachings.

At 402, the carriage is moved left while maintaining the nozzles in an open condition. For purposes of the present example, the carriage 306 is shifted left a relatively minor amount in accordance with operations to be performed by the ink pump 322 and/or ink pump 326. The lever arm 304 is still sufficiently displaced such that the nozzles 310 and 312 remain open to ambient conditions. Other printer operations can also be performed that are not germane to the present teachings.

At 404, the ink pumps are rotated to a starting position. For purposes of the present example, the ink pump 322 and the ink pump 326 are defined by respective peristaltic pumps. The ink pumps 322 and 326 are rotated by way of a motor drive such that a roller of each is on top of or coincident with a respective cam. Rotation of the ink pumps 322 and 326 is temporarily halted in this position.

At 406, the carriage is moved left sufficiently that the nozzles are closed. For purposes of the present example, the carriage 306 is shifted left and out of force contact with the lever arm 304. In response, the actuator 302 is angularly displaced by way of the spring 314 such that the valve pad 308 is returned to sealing contact with the nozzles 310 and 312. The nozzles 310 and 312 are now closed, preventing atmospheric air from entering the cap 320.

At 408, the ink pumps are rotated so that air and ink are drawn from printheads in the carriage. For purposes of the present example, the ink pump 322 and the ink pump 326 are respectively rotated so that air and ink are drawn from the printheads 306A thus evacuating an unknown ratio of ink and air in preparation for ink priming. Other printer operations can also be performed that are not germane to the present teachings.

At 410, the carriage is moved to the right so as to open the nozzles while the ink pumps continue to be rotated. For purposes of example, it is assumed that the printhead carriage 306 is moved right sufficiently to make force contact with the lever arm 304. In turn, the actuator 302 is angularly displaced so as to move the valve pad 308 out of sealing contact with the nozzles 310 and 312. The nozzles 310 and 312 are now open and in fluid communication with ambient conditions (air or gas). The ink pumps 322 and 326 are also in fluid communication with such ambient conditions by virtue of respective fluid couplings with the nozzles 310 and 312.

At 412, remaining pump operations are performed in preparation for printing. For purposes of non-limiting example, the ink pump 322 and the ink pump 326 can be rotated so as to evacuate any remaining ink(s) from the cap 320, so as to prime the printheads 306A with ink(s) not mixed with air, to disengage the roller from the cam of the ink pump 322 or ink pump 326, and so on. Other ink pump 322 or 326 or printer 300 operations can also be performed that are not germane to the present teachings.

At 414, the carriage is moved left into a print-ready position such that the nozzles are closed. For purposes of the present example, the carriage 306 is shifted left and out of contact with the lever arm 304. In turn, the actuator 302 is angularly displaced by way of the spring 314 such that the nozzles 310 and 312 are closed by way of the valve pad 308. The printer 300 is now understood to ready to perform normal printing operations.

Illustrative Nozzle with Valve Seat

Figure 5A:
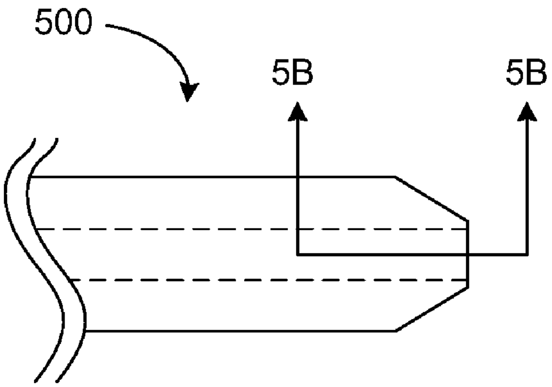
FIG. 5A is a plan view of details of a nozzle according to one example of the present teachings.
Figure 5B:
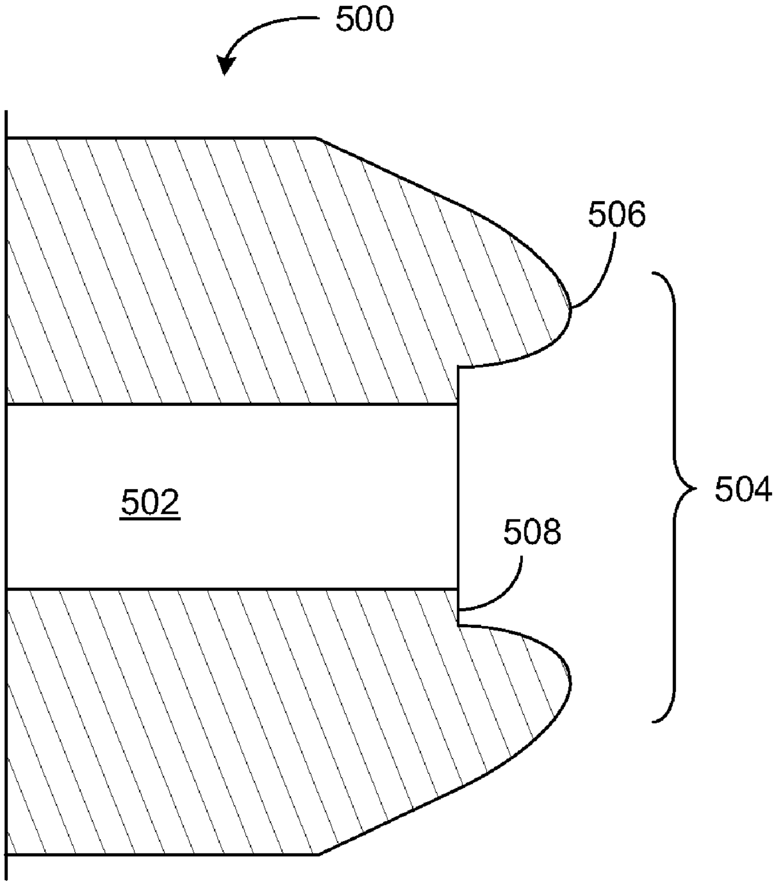
FIG. 5B is a plan sectional view of a portion of the nozzle of FIG. 5A.

Reference is now made to FIGS. 5A and 5B, which depict a portion of a nozzle 500 and a sectional view thereof, respectively. The nozzle 500 is illustrative and non-limiting with respect to the present teachings. Other nozzles, devices or systems can be configured and/or operated in accordance with the present teachings.

The nozzle 500 includes or defines a fluid passageway 502. The fluid passageway is configured for the communication of liquids or gases such as, for non-limiting example, liquid ink, atmospheric air, and so on. The nozzle 500 can further communicate such fluids to other entities by way of tubing or conduits.

The nozzle 500 further includes or defines a valve seat 504. The valve seat 504 is characterized by a rounded lip-like feature 506 that encircles the fluid passageway 502. The valve seat 504 is configured to be sealed or closed by way of contact with a compliant valve pad material (e.g., 112). The valve seat 504 can make non-damaging contact with, while being reliably sealed by, a compliant valve pad by virtue of the rounded lip-like feature 506.

The nozzle 500 is further characterized by a step-like feature 508 that encircles the fluid passageway 502. The nozzle 500 is therefore characterized by a transition or step-change in the cross-sectional area of the fluid passageway 502. It is noted that the step-like feature 508 is relatively proximate to—but not coincident or co-planar with—the valve seat 504. This spaced arrangement of the valve seat 504 and the step-like feature 508 eases the manufacturing process of the nozzle 500 when injection molding or similar processes are used.

The nozzle 500 is characteristic of any number of similar nozzles contemplated by the present teachings. Such nozzles can be suitably varied in their respective geometries and form factors. For example, the nozzles 114, 216, 218, 310 and 312 can have respective features equivalent to those of the nozzle 500.

Illustrative Apparatus

Figure 6:
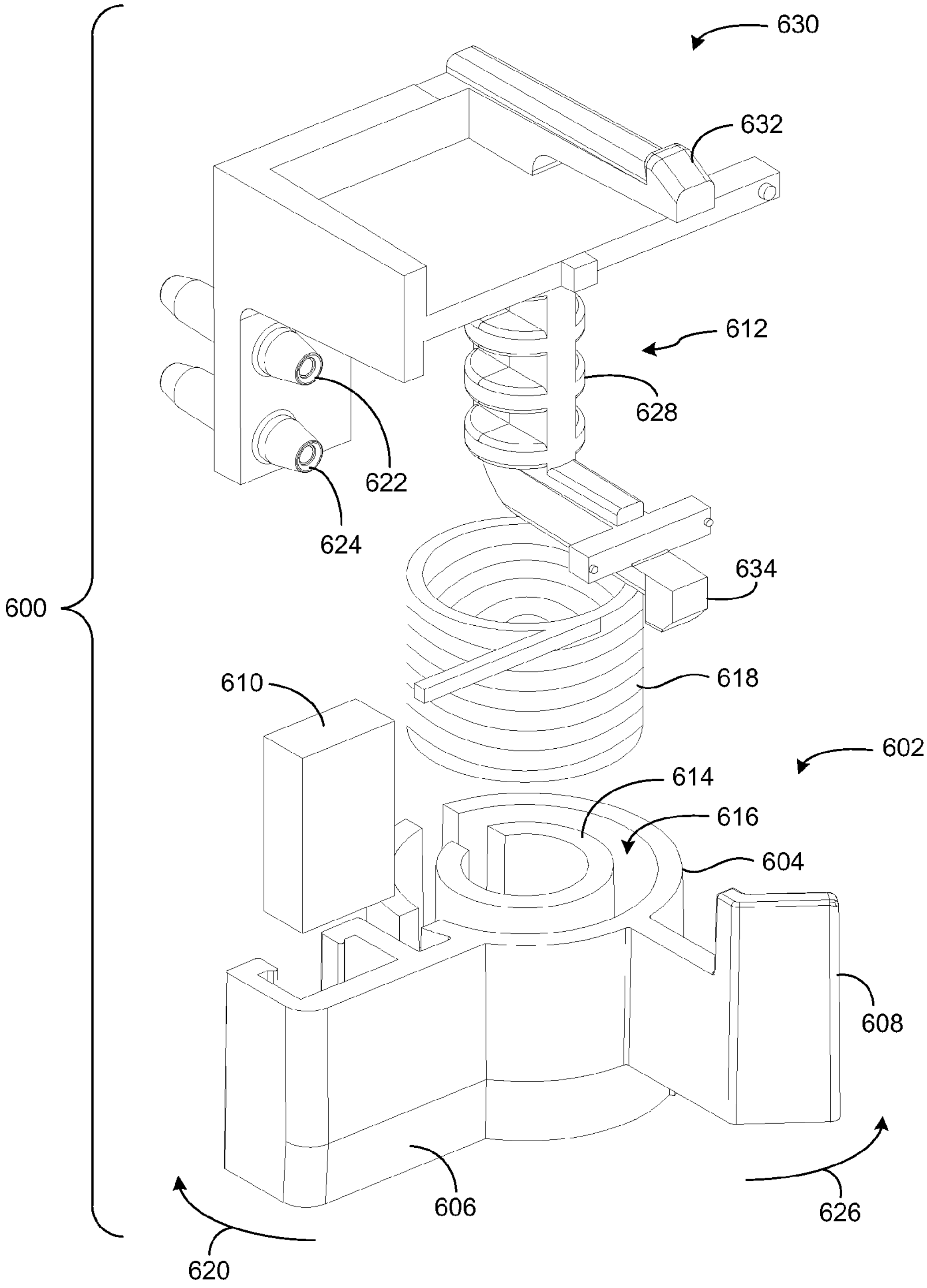
FIG. 6 is an exploded isometric view depicting an apparatus according to another example of the present teachings.

Attention is now directed to FIG. 6, which depict an exploded isometric view of an apparatus 600 according to one example of the present teachings. The apparatus 600 is illustrative and non-limiting with respect to the present teachings. Other actuators, nozzles, apparatus, devices or systems can be configured and/or operated in accordance with the present teachings.

The apparatus 600 includes a body portion 602. The body portion 602 is also referred to as an actuator 602 and can be formed from any suitable rigid material such as acetal, aluminum, and so on. The actuator 602 includes a cylindrical portion 604, a support arm 606 and a lever arm 608. The support arm 606 is configured to support a compliant valve pad 610. The lever arm 608 is configured to cause the actuator 602 to rotate about a shaft 612 in response to a force contact against the lever arm 608. The actuator 602 further includes an inner sleeve portion 614 concentric to and spaced apart from the cylindrical portion 604 such that a void or channel 616 is defined there between. In one example, the actuator 602 is formed as a monolithic structure including the cylindrical portion 604 and the support arm 606 and the lever arm 608 and the inner sleeve portion 614 as respective features thereof.

The channel 616 is configured to supportingly receive a helical torsion spring (spring) 618. In one example, the spring 618 is formed from spring steel. Other suitable materials can also be used. The spring 618 is configured to bias the actuator 602 so as to rotate in a first angular direction 620, bringing the compliant valve pad 610 into sealing contact with respective nozzles 622 and 624. In turn, force contact against the support arm 606 causes the actuator 602 to rotate in a second angular direction 626, displacing the compliant valve pad 610 out of sealing contact with the nozzles 622 and 624.

The actuator 602, with the spring 618 supported therein, is rotatably received on the shaft 612 when the apparatus 600 is in an assembled state. The shaft 612 includes a plurality of disk-like features 628 to maintain axial alignment of the body portion 602 on the shaft 612.

The shaft 612 is a portion of a main support 630. The main support 630 also includes respective tooth-like latches 632 and 634 configured to hold the entire apparatus 600 in a removably fixed position within a printer (e.g., 300). The main support 630 also supports the nozzles 622 and 624 in a position proximate to the body portion 602. In one example, the main support 630 is formed from the same material as the body portion 602. Other suitable materials can also be used. In one example, the main support 630 is formed as a monolithic structure including the shaft 612 and the nozzles 622 and 624 and the latches 632 and 634 as respective portions or features thereof.

In general, and without limitation, the present teachings contemplate actuators for use printers and related apparatus. An actuator is rotationally supported on a shaft and is biased by way of a spring toward a first operational state. A compliant valve pad material makes sealing contact with a plurality of nozzles when the actuator is in the first or resting operational state, thus closing the nozzles against fluid communication with ambient conditions.

A lever arm of the actuator is subject to force contact from a movable printhead carriage of the printer or apparatus, thus driving angular displacement of the actuator about the shaft toward a second operational state. The valve pad material is moved out of sealing contact with the plurality of nozzles when the actuator is displaced sufficiently by way of the lever arm. The nozzles are now open to fluid communication with ambient conditions when the actuator is in or sufficiently displaced towards the second operational state.

The actuator can be formed from any suitable material such that the lever arm, valve pad support arm and cylindrical actuator body define a one-piece construct. The spring biasing can be provided by way of a helical spring disposed within the cylindrical body aspect of the actuator and supported on the shaft. The spring is mechanically oriented with respect to the actuator so that the valve pad applies about equal loading force to the plurality of nozzles when such are closed.

Suitable supporting structure can be provided so that the valve actuator, including the spring and support shaft, are fixedly disposed in cooperative orientation with a printhead carriage, ink pump, or other aspects of a printer or imaging apparatus. The present teachings thus contemplate relatively compact actuators respectively configured to contemporaneously open or close a plurality of nozzles by way of printhead carriage positioning.

In general, the foregoing description is intended to be illustrative and not restrictive. Many embodiments and applications other than the examples provided would be apparent to those of ordinary skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A mechanism, comprising:

a pair of nozzles for fluid communication;

a valve pad; and an actuator having a support arm to support the valve pad, the actuator including a helical torsion spring to bias the valve pad into sealing contact with the nozzles, the actuator having a lever arm configured such that an angular displacement thereof moves the valve pad out of sealing contact with the nozzles, the actuator having a cylindrical wall portion disposed about the helical torsion spring, the actuator having an inner sleeve portion concentric to and spaced apart from the cylindrical wall portion, the cylindrical wall portion and the lever arm and the support arm and the inner sleeve portion being respective features of a monolithic structure, the lever arm and the support arm respectively extending away from the cylindrical wall portion.

2. The mechanism according to claim 1, the lever arm including a first portion that extends about radially away from the actuator, the lever arm including a second portion disposed at an angle of greater than twenty degrees to the first portion.

3. The mechanism according to claim 2, the lever arm further configured to be angularly displaced by way of contact with a printer carriage, the second portion of the lever arm being about parallel to the contacting portion of the carriage when the carriage is in a home position.

4. The mechanism according to claim 1, the pair of nozzles being fluidly coupled to an ink pump of a printing apparatus by way of respective fluid conduits.

5. The mechanism according to claim 1, the actuator rotatably supported on a shaft disposed within the inner sleeve portion.

6. The mechanism according to claim 5, the shaft including a plurality of spaced disk-like portions to maintain the actuator in axial alignment with the shaft.

7. The mechanism according to claim 1, each of the nozzles defining a valve seat having a rounded lip-like feature, the valve pad to make compliant sealing contact with the valve seat of each of the nozzles.

8. A plural valve mechanism, comprising:

a plurality of nozzles each defining a valve seat;

a valve pad to close the nozzles by way of sealing contact with the valve seats; and an actuator including a spring to urge the valve pad into closing the nozzles by way of angular displacement of the actuator in a first direction, the actuator including a support arm to support the valve pad, the actuator including a lever arm to displace the valve pad to open the nozzles by way of angular displacement of the actuator in a second direction opposite to the first direction, the actuator including a cylindrical wall portion and an inner sleeve portion concentric with and spaced apart from the cylindrical wall portion defining a channel there between, the spring. disposed within the channel, the lever arm and the support arm respectively extending away from the cylindrical wall portion.

9. The plural valve mechanism according to claim 8, the spring mechanically coupled to the actuator such that an about equal loading force is applied to the respective valve seats when the valve pad is in sealing contact therewith.

10. The plural valve mechanism according to claim 8, the actuator supported on a shaft, the shaft including spaced disk-like features to maintain axial alignment of the spring and the actuator with the shaft.

11. The plural valve mechanism according to claim 8, each of the nozzles defining a fluid passageway characterized by a transition in cross sectional area disposed so as to not interfere with sealing contact of the valve pad with the valve seat.

* * * * *

UNITED STATES PATENT AND TRADEMARK OFFICE

CERTIFICATE OF CORRECTION

PATENT NO. : 8,376,531 B2
APPLICATION NO. : 13/053434
DATED : February 19, 2013
INVENTOR(S) : Lynn A Collie et al.

It is certified that error appears in the above-identified patent and that said Letters Patent is hereby corrected as shown below:

In the Claims

In column 10, line 11, in Claim 8, delete "spring." and insert -- spring --, therefor.

Signed and Sealed this
Fourth Day of June, 2013

Teresa Stanek Rea
*Acting Director of the United States Patent and Trademark Office*